United States Patent
Oren et al.

(10) Patent No.: US 7,941,605 B1
(45) Date of Patent: May 10, 2011

(54) METHODS AND APPARATUS FOR GENERATING A RESULT BASED ON A LOOKUP RESULT FROM A LOOKUP OPERATION USING AN ASSOCIATIVE MEMORY AND PROCESSING BASED ON A DISCRIMINATOR PORTION OF A LOOKUP WORD

(75) Inventors: Eyal Oren, Tel Aviv (IL); Oded Trainin, Tel Aviv (IL); Gil Goren, Ashland, MA (US)

(73) Assignee: Cisco Technology, Inc, San Jose, CA (US)

( * ) Notice: Subject to any disclaimer, the term of this patent is extended or adjusted under 35 U.S.C. 154(b) by 265 days.

(21) Appl. No.: 10/286,007

(22) Filed: Nov. 1, 2002

(51) Int. Cl.
*G06F 12/00* (2006.01)

(52) U.S. Cl. . 711/128; 711/108; 711/221; 707/E17.002; 707/E17.034; 707/E17.035; 707/E17.037; 707/E17.038

(58) Field of Classification Search .................. 711/128, 711/108, 221; 707/E17.002, E17.034, E17.035, 707/E17.037, E17.038
See application file for complete search history.

(56) References Cited

U.S. PATENT DOCUMENTS

| | | |
|---|---|---|
| 3,648,254 A | 3/1972 | Beausoleil |
| 4,296,475 A | 10/1981 | Nederlof et al. |
| 4,791,606 A | 12/1988 | Threewitt et al. |
| 4,996,666 A | 2/1991 | Duluk, Jr. |
| 5,319,763 A | 6/1994 | Ho et al. |
| 5,339,076 A | 8/1994 | Jiang |
| 5,383,146 A | 1/1995 | Threewitt |
| 5,404,482 A | 4/1995 | Stamm et al. |
| 5,428,565 A | 6/1995 | Shaw |
| 5,440,715 A | 8/1995 | Wyland |
| 5,450,351 A | 9/1995 | Heddes |
| 5,515,370 A | 5/1996 | Rau |
| 5,564,052 A | 10/1996 | Nguyen et al. |
| 5,684,954 A | 11/1997 | Kaiserswerth et al. |
| 5,740,171 A | 4/1998 | Mazzola et al. |
| 5,796,758 A * | 8/1998 | Levitan ............. 714/800 |

(Continued)

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

(Continued)

*Primary Examiner* — Midys Rojas
(74) *Attorney, Agent, or Firm* — The Law Office of Kirk D. Williams

(57) ABSTRACT

Methods and apparatus are disclosed for generating a result based on a lookup result from a lookup operation using an associative memory and processing based on a discriminator portion of a lookup word. A first lookup operation is performed to generate a lookup result. In one implementation, a second lookup operation is performed based on a discriminator or the lookup result depending on the result of an evaluation, such as whether there was a hit or the lookup result matches a predetermined value. In one implementation, a second lookup operation is performed based on the discriminator, and either the result of the first or second lookup operation is used for subsequent processing. One implementation performs a lookup operation based on a lookup word to generate a lookup result, which is used to retrieve a base address and a bitmap from a memory. A discriminator is identified, and the result is generated based on the discriminator, the bitmap, and the base address, such as by adding to the base address the number of set bits in a range within the bitmap.

8 Claims, 16 Drawing Sheets

U.S. PATENT DOCUMENTS

| | | | |
|---|---|---|---|
| 5,802,567 | A | 9/1998 | Liu et al. |
| 5,813,040 | A * | 9/1998 | Rathke .................... 711/156 |
| 5,835,963 | A | 11/1998 | Yoshioka et al. |
| 5,841,874 | A | 11/1998 | Kempke et al. |
| 5,852,569 | A | 12/1998 | Srinivasan et al. |
| 5,898,689 | A | 4/1999 | Kumar et al. |
| 5,920,886 | A | 7/1999 | Feldmeier |
| 5,920,900 | A | 7/1999 | Poole et al. |
| 5,956,336 | A | 9/1999 | Loschke et al. |
| 5,978,885 | A | 11/1999 | Clark, II |
| 6,000,008 | A | 12/1999 | Simcoe |
| 6,026,467 | A | 2/2000 | Petty |
| 6,034,965 | A | 3/2000 | Pollack et al. |
| 6,041,389 | A | 3/2000 | Rao |
| 6,047,369 | A | 4/2000 | Colwell et al. |
| 6,069,573 | A | 5/2000 | Clark, II et al. |
| 6,081,440 | A | 6/2000 | Washburn et al. |
| 6,097,724 | A | 8/2000 | Kartalopoulos |
| 6,134,135 | A | 10/2000 | Andersson |
| 6,137,707 | A | 10/2000 | Srinivasan et al. |
| 6,148,364 | A | 11/2000 | Srinivasan et al. |
| 6,154,384 | A | 11/2000 | Nataraj et al. |
| 6,175,513 | B1 | 1/2001 | Khanna |
| 6,181,698 | B1 | 1/2001 | Hariguchi |
| 6,199,140 | B1 | 3/2001 | Srinivasan et al. |
| 6,219,748 | B1 | 4/2001 | Srinivasan et al. |
| 6,233,652 | B1 | 5/2001 | Mathews et al. |
| 6,236,658 | B1 | 5/2001 | Essbaum et al. |
| 6,237,061 | B1 | 5/2001 | Srinivasan et al. |
| 6,240,003 | B1 | 5/2001 | McElroy |
| 6,240,485 | B1 | 5/2001 | Srinivasan et al. |
| 6,246,601 | B1 | 6/2001 | Pereira |
| 6,295,576 | B1 | 9/2001 | Ogura et al. |
| 6,307,855 | B1 | 10/2001 | Hariguchi |
| 6,308,219 | B1 | 10/2001 | Hughes |
| 6,374,326 | B1 | 4/2002 | Kansal et al. |
| 6,377,577 | B1 | 4/2002 | Bechtolsheim et al. |
| 6,389,506 | B1 | 5/2002 | Ross et al. |
| 6,430,190 | B1 | 8/2002 | Essbaum et al. |
| 6,434,662 | B1 | 8/2002 | Greene et al. |
| 6,493,812 | B1 | 12/2002 | Lyon |
| 6,526,474 | B1 | 2/2003 | Ross |
| 6,535,951 | B1 | 3/2003 | Ross |
| 6,715,029 | B1 | 3/2004 | Trainin et al. |
| 6,763,426 | B1 * | 7/2004 | James et al. .................. 711/108 |
| 6,954,823 | B1 * | 10/2005 | James et al. .................. 711/108 |
| 2003/0018879 | A1 * | 1/2003 | Sahraoui et al. .................. 712/1 |

OTHER PUBLICATIONS

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief, AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Donald R. Morrison, "PATRICIA—Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM SIGMETRICS Performance Evaluation Review, vol. 26 No. 1, Jun. 1998, p. 1-10.

Stefan Nilsson and Gunnar Karlsson, "Fast Address Look-up for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE NetWork Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconnections: Bridges, Routers, Switches, and Internetworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999. ACM SIGCOMM'99, Sep. 1999 (12 pages).

Srinivasan et al., "Fast and Scalable Layer Four Switching," ACM Computer Communication Review, 28(4):191-202, 1998. ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

* cited by examiner

METHODS AND APPARATUS FOR GENERATING A RESULT BASED ON A LOOKUP RESULT FROM A LOOKUP OPERATION USING AN ASSOCIATIVE MEMORY AND PROCESSING BASED ON A DISCRIMINATOR PORTION OF A LOOKUP WORD

FIELD OF THE INVENTION

This invention especially relates to computer and communications systems, including programming and using an associative memory such as, but not limited to a content-addressable memory; and more particularly, the invention relates to methods and apparatus for generating a result based on a lookup result from a lookup operation using an associative memory and processing based on a discriminator portion of a lookup word.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match. Various applications that use packet classification, such as Security Access Control, Quality of Service etc., typically need to perform many matches on source and destination port numbers, protocol and other header fields, etc. Additionally, supporting IPv6 and various tunneling techniques has increased the complexity of packet forwarding. For example, an IPv6 requires 128 bit forwarding and tunneling requires additional bits.

Known approaches of packet classification include using custom application-specific integrated circuits (ASICs), custom circuitry, software or firmware controlled processors, binary and ternary content-addressable memories (CAMs). The use of programmable software or firmware have advantages as they provide some level of flexibility, which becomes especially important as new protocols and services are added to existing network. Customer typically desire to use their existing hardware (e.g., routers, switches etc.) to support these new protocols and services. However, known software and firmware implementations are relatively slow, and typically place a performance bound which may be incompatible with new requirements.

CAMs are increasingly being used in packet classification especially because of their performance. A typical implementation performs a lookup operation on a CAM with the CAM result being used as input to a memory, which produces the actual result used in processing a packet. However, these content-addressable memories are typically expensive in terms of power consumption and space, and are limited in the size of an input word (e.g., 72, 144, etc.) on which a lookup operation is performed.

In certain applications, it is often necessary to perform a classification operation (and thus a corresponding lookup operation) on a lookup word including multiple fields. For example, the lookup word might include a MPLS tag and IP address. For a particular packet and corresponding lookup operation, the value of one of the fields might be empty or irrelevant to a particular lookup operation. The associative memory could be programmed with entries containing the relevant field and all possible values of the empty or irrelevant information, however this consumes entries and sometimes a lot of entries (and which may not be available). Moreover, it might not be known whether one of these fields is empty or irrelevant until after a lookup operation is performed based on values of both fields.

Desired are new methods and apparatus for performing lookup operations, especially those which might decrease the size of an associative memory required or increase the packet processing capabilities supported by an associative memory.

SUMMARY OF THE INVENTION

Methods and apparatus are disclosed for generating a result based on a lookup result from a lookup operation using an associative memory and processing based on a discriminator portion of a lookup word. One embodiment identifies a lookup word, where the lookup word includes a discriminator and a lookup word portion. A first lookup operation is performed based on the lookup word to generate a lookup result which includes a first lookup result value. One embodiment then performs a second lookup operation based either on the lookup result value or the discriminator to generate the result; while one embodiment performs a second lookup operation based on the discriminator to generate a second result value, and then selects between the first and second lookup result values. In one embodiment, the determination of which intermediate result to use includes examining a hit/no hit indication. In one embodiment, the determination of which intermediate result to use includes comparing the result of the first lookup operation to a predetermined value or values.

One embodiment performs a lookup operation based on a lookup word to generate a lookup result, which is used to retrieve a base address and a bitmap from a memory. A discriminator is identified, and the result is generated based on the discriminator, the bitmap, and the base address. One embodiment includes identifying a bit in the bitmap based on the discriminator and signaling a match or hit if the bit is set. One embodiment includes determining a number of set bits in the bitmap from position zero to the bit and setting the result to said number of set bits plus the base address. The lookup word may or may not include the discriminator.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
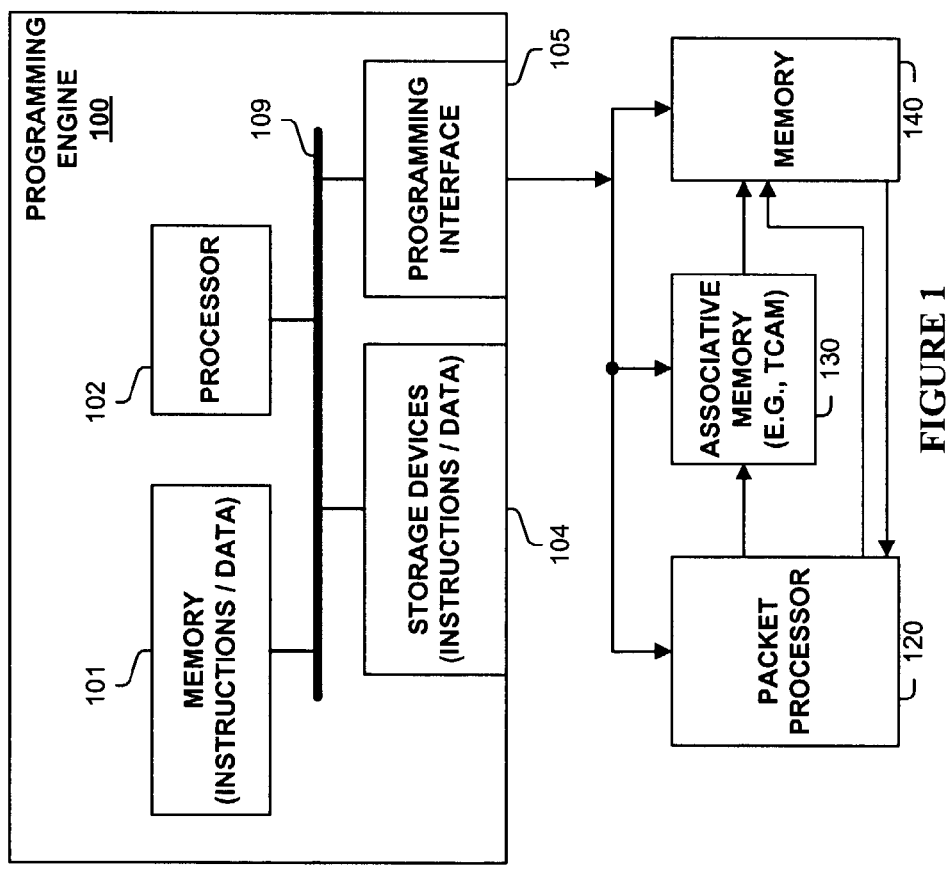
FIG. 1 is a block diagram of an embodiment for programming an associative memory and packet processor.

Methods and apparatus are disclosed for generating a result based on a lookup result from a lookup operation using an associative memory and processing based on a discriminator portion of a lookup word. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, and/or storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" refers to all types of known or future developed associative memories, including, but not limited to binary and ternary content-addressable memories, hash tables, TRIE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for generating a result based on a lookup result from a lookup operation using an associative memory and processing based on a discriminator portion (also referred to as a discriminator or discriminator field) of a lookup word. One embodiment identifies a lookup word, where the lookup word includes a discriminator and a lookup word portion. A first lookup operation is performed based on the lookup word to generate a lookup result which includes a first lookup result value. One embodiment then performs a second lookup operation based either on the lookup result value or the discriminator to generate the result; while one embodiment performs a second lookup operation based on the discriminator to generate a second result value, and then selects between the first and second lookup result values. In one embodiment, the determination of which intermediate result to use includes examining a hit/no hit indication. In one embodiment, the determination of which intermediate result to use includes comparing the result of the first lookup operation to a predetermined value or values.

One embodiment performs a lookup operation based on a lookup word to generate a lookup result, which is used to retrieve a base address and a bitmap from a memory. A discriminator is identified, and the result is generated based on the discriminator, the bitmap, and the base address. One embodiment includes identifying a bit in the bitmap based on the discriminator and signaling a match or hit if the bit is set. One embodiment includes determining a number of set bits in the bitmap from position zero to the bit and setting the result to said number of set bits plus the base address. The lookup word may or may not include the discriminator.

FIG. 1 illustrates one embodiment of a system, which may be part of a router or other communications or computer system, for programming and using a packet processor and an associative memory, such as, but not limited to a binary or ternary content-addressable memory. In one embodiment, programming engine 100 receives or determines a list of entries, an identification of lookup word and discriminator portions of data items, possibly a mask to program associative memory 130, and corresponding values to program memory 140. Programming engine 100 typically also configures packet processor to extract appropriate lookup word and discriminator portions of a set of information.

In one embodiment, programming engine 100 includes a processor 102, memory 101, storage devices 104, and programming interface 105, which are coupled via one or more communications mechanisms 109 (shown as a bus for illustrative purposes). Various embodiments of programming engine 100 may include more or less elements. The operation of programming engine 100 is typically controlled by processor 102 using memory 101 and storage devices 104 to perform one or more tasks or processes. Memory 101 is one type of computer-readable medium, and typically comprises random access memory (RAM), read only memory (ROM), flash memory, integrated circuits, and/or other memory components. Memory 101 typically stores computer-executable instructions to be executed by processor 102 and/or data which is manipulated by processor 102 for implementing functionality in accordance with the invention. Storage devices 104 are another type of computer-readable medium, and typically comprise solid state storage media, disk drives, diskettes, networked services, tape drives, and other storage devices. Storage devices 104 typically store computer-executable instructions to be executed by processor 102 and/or data which is manipulated by processor 102 for implementing functionality in accordance with the invention.

Figure 2A:
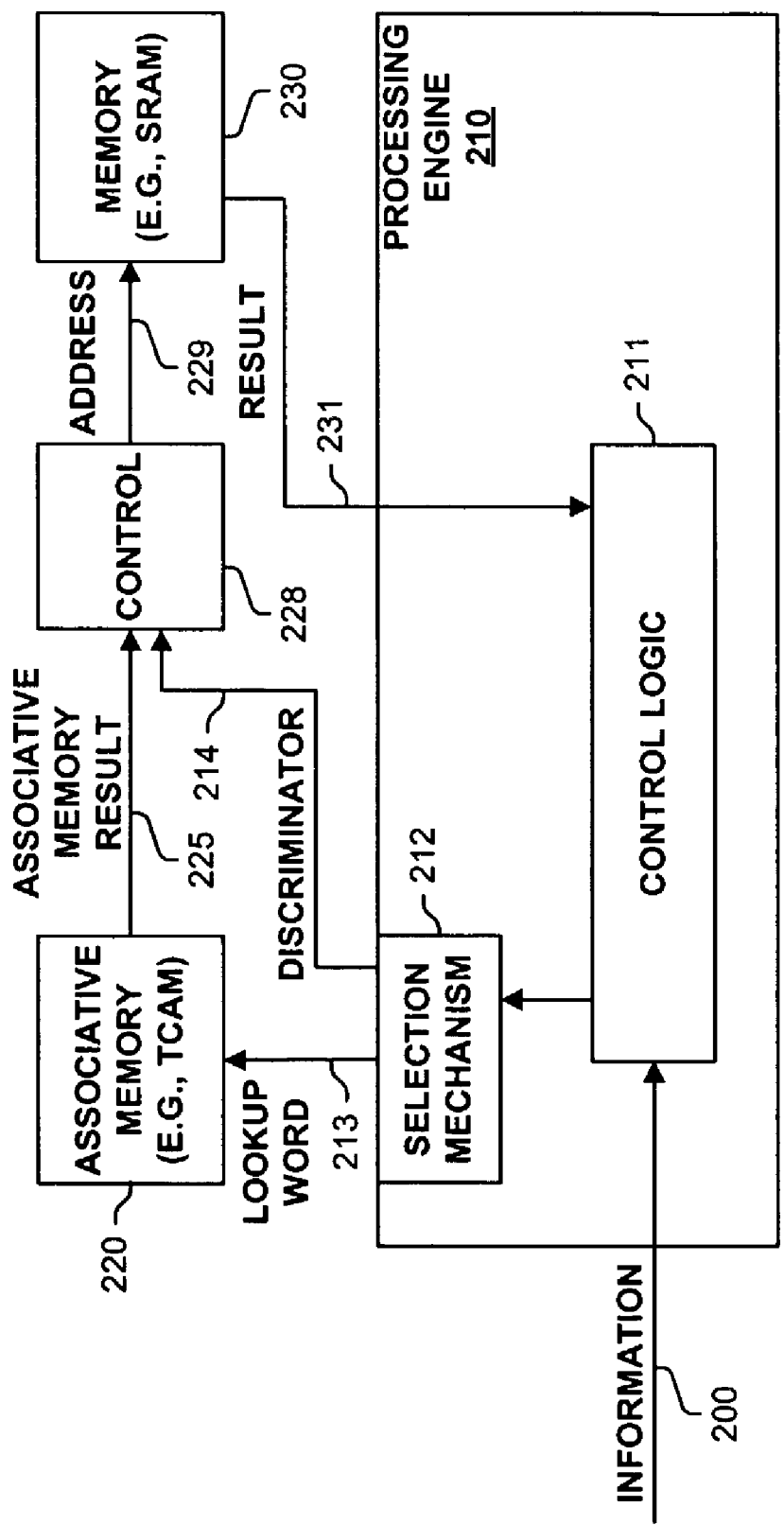
FIGS. 2A-B are block diagrams of exemplary embodiments performing packet processing.

FIG. 2A illustrates one embodiment of a system, which may be part of a router or other communications or computer system, for programming and using a packet processor and an associative memory, such as, but not limited to a binary or ternary content-addressable memory. Information 200, such as packets or portions thereof, is received by processing engine 210. Control logic 211 typically controls the operation of processing engine 210 and forwards a set of received information to a selection mechanism 212, which selectively provides a lookup word 213 to associative memory 220 and a discriminator 214 to memory 230. In one embodiment, selection mechanism 212 is simply hardwired circuitry. In one embodiment, selection mechanism 212 comprises a dynamic, static, and/or programmable mechanism, including such devices as a matrix, shift register, and other selection devices to selectively extract lookup word 213 and discriminator 214. In one embodiment, discriminator 214 includes a small number (e.g., between one and sixteen) of bits of information 200.

Associative memory 220 typically performs a lookup operation based on lookup word 213, which may optionally include information from another source or other statically or dynamically programmed information. The produced associative memory result 225 and discriminator 214 are used by control 228 to produce address 229, which is provided to memory 230 to produce result 231. Control 228 can manipulate associative memory result 225 and discriminator 214 in any conceivable manner to produce address 229. In one embodiment, memory result 225 and discriminator 214 are concatenated together to produce memory address 229. In one embodiment, control 228 manipulates and possibly performs a hashing operation to generate address 229. In one embodiment, memory result 225 and discriminator 214 are provided directly to memory 230. Based on associative memory result 225 and discriminator 214, memory 230 produces result 231, which is typically used by processing engine 210 to process information 200 (e.g., a received packet.)

Figure 2B:
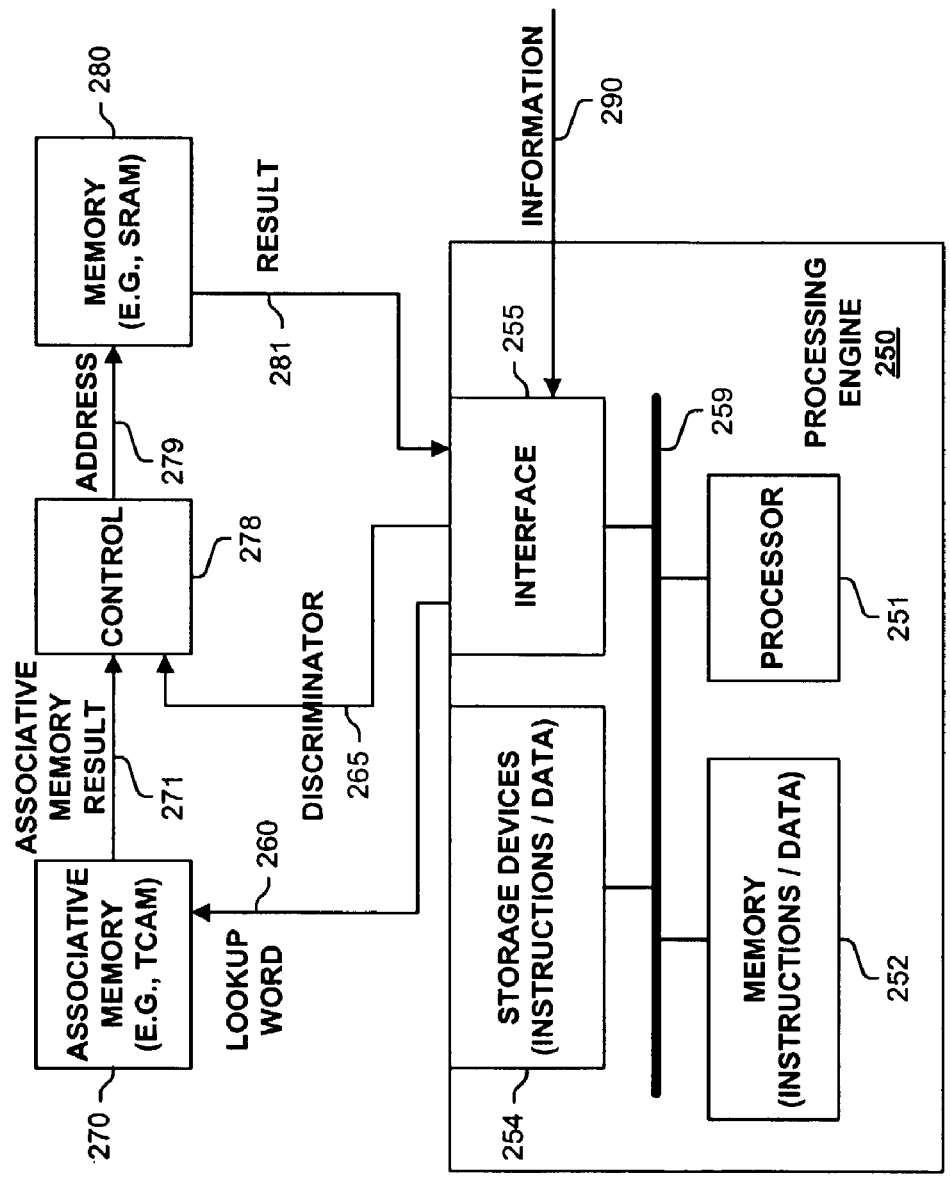

FIG. 2B illustrates one embodiment of a system, which may be part of a router or other communications or computer system, for programming and using multiple virtual portions of a single associative memory, such as, but not limited to a binary or ternary content-addressable memory. In one embodiment, processing engine 250 includes a processor 251, memory 252, storage devices 254, and interface 255, which are coupled via one or more communications mechanisms 259 (shown as a bus for illustrative purposes). Various embodiments of processing engine 250 may include more or less elements. The operation of processing engine 250 is typically controlled by processor 251 using memory 252 and storage devices 254 to perform one or more tasks or processes.

Information 290, such as packets or portions thereof, is received by processing engine 250, which extracts a lookup word 260 and discriminator 265, which are provided to associative memory 270 and memory 280 respectively via interface 255. A lookup operation is performed on lookup word 260 by associative memory 270 to produce associative memory result 271, which is used, along with discriminator 265, as input to control 278 to produce address 279 used by memory 280 to produce one or more results 281. In one embodiment, associative memory result 271 and discriminator 265 are provided directly to control memory 280.

In one embodiment, processor 251 performs further processing based on a discriminator portion of a lookup word, such as, but not limited to performing a second lookup operation in memory 252 and selecting a result from multiple intermediate results. In one embodiment, processor 251 performs further processing which may include determining an address to use for subsequent processing based on discriminator 265 and a base address and bitmap stored in memory 252.

Figure 3A:
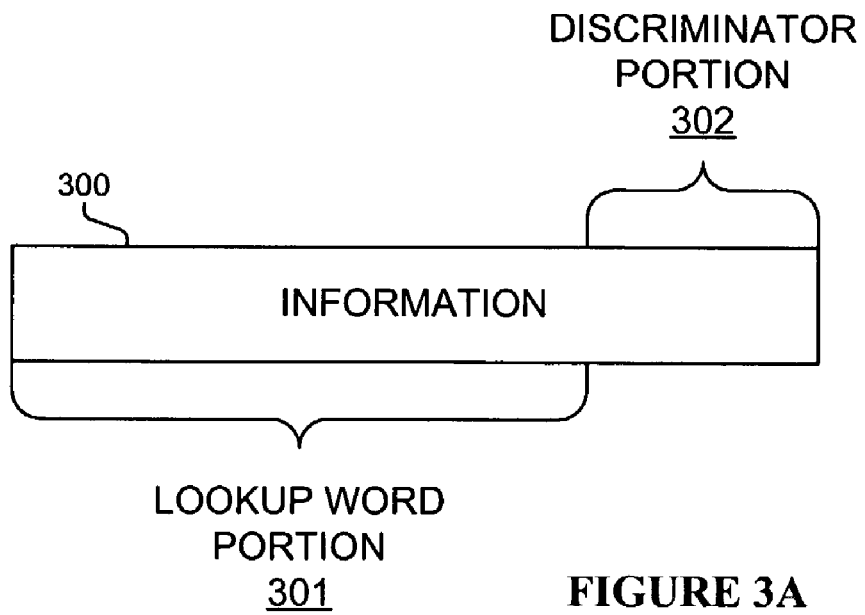
FIGS. 3A-C are exemplary sets of information having lookup word and discriminator portions.
Figure 3B:
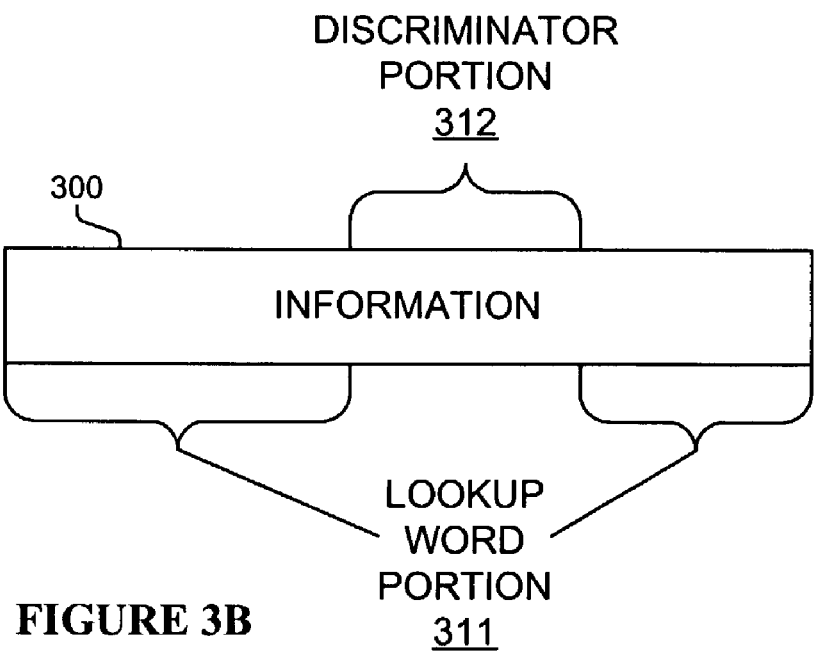
Figure 3C:
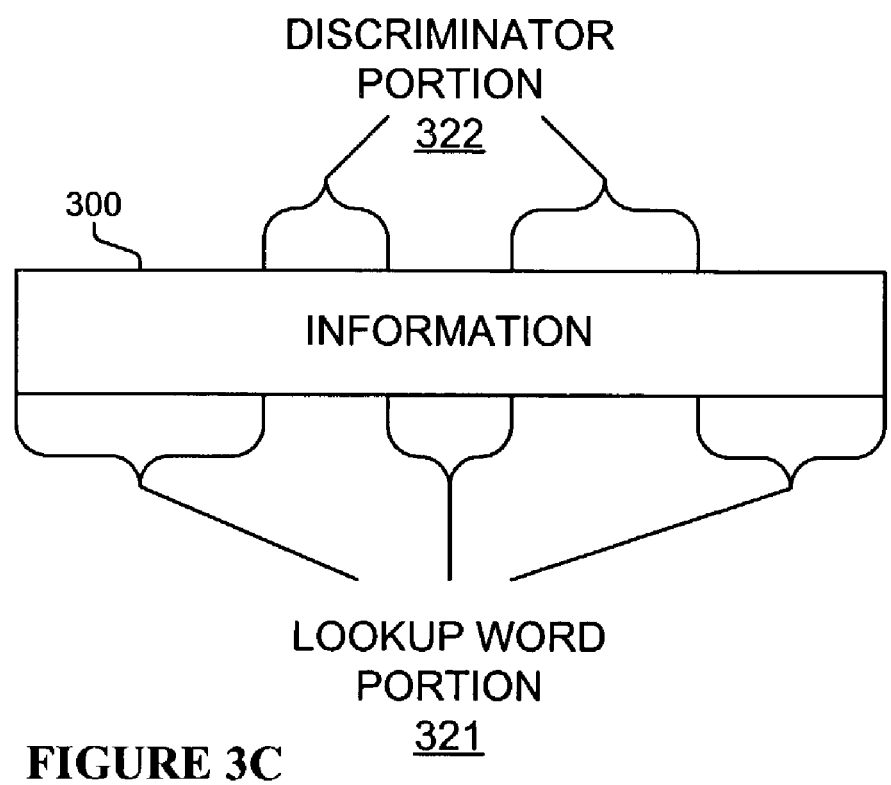

FIGS. 3A-C illustrate an exemplary extraction locations for the lookup word and discriminator portions of information 300. As shown in FIG. 3A, lookup word portion 301 and discriminator portion 302 are both contiguous blocks of bits within information 300. As shown in FIG. 3B discriminator portion 312 is contiguous within a distributed lookup word portion 311 within information 300. As shown in FIG. 3C, lookup word portion 321 and discriminator portion 322 are extracted from distributed locations within information 300. Selection mechanism 212 (FIG. 2A), processing engine 250 (FIG. 2B), or another selection mechanism used in one embodiment selectively, whether statically or programmatically, extracts the appropriate lookup word and discriminator portions.

Figure 4:
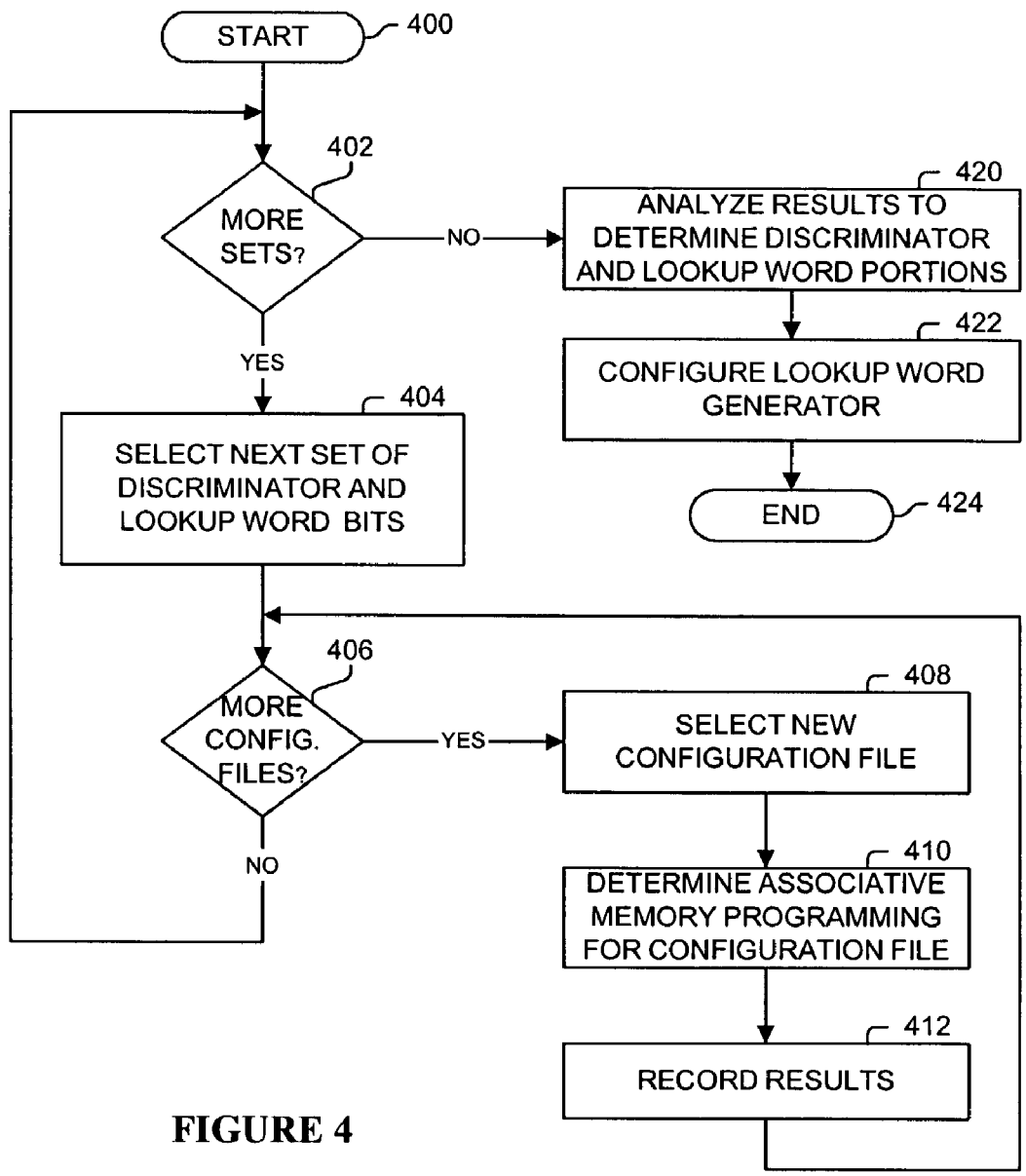
FIG. 4 is a block diagram of a process for determining a partitioning of a set of information into lookup word and discriminator portions.

FIG. 4 illustrates a flow diagram of one process used in one embodiment for determining a partitioning of a set of information into lookup word and discriminator portions, and for optionally configuring or programming a lookup word generator (e.g., a selection mechanism) to extracting the appropriate portions of a received set of information. Processing begins with process block 400. If, as determined in process block 402, while there are more sets of discriminator bits, process blocks 404-412 are repeatedly performed. Each possible set of discriminator bits may include a single bit or multiple bits, which each bit located in any position within a set of information. In process block 404, a next set of discriminator and lookup word bits are selected. Then, as determined in process block 406, while there are more exemplary configuration files to test, a new configuration file is selected in process block 408, an associative memory programming is determined for the current configuration file, and the results are recorded in process block 412. In one embodiment, the results include the number of resultant associative memory entries.

When all sets of discriminator bits have been tested as determined in process block 402, the results are analyzed in process block 420 to determine and select the appropriate discriminator and lookup word portions. For example, a selection of the discriminator and lookup word portions may be selected based on a minimum number of associative memory entries, and possibly a number of memory locations required. Next, in process block 422, the lookup word generator is configured to produce the required lookup word and discriminator portions of a received set of information. In one embodiment, the configuration is either manually or automatically configured, such as by physically routing connections or programming a lookup word generator. Processing is complete as indicated in process block 424.

Figure 5:
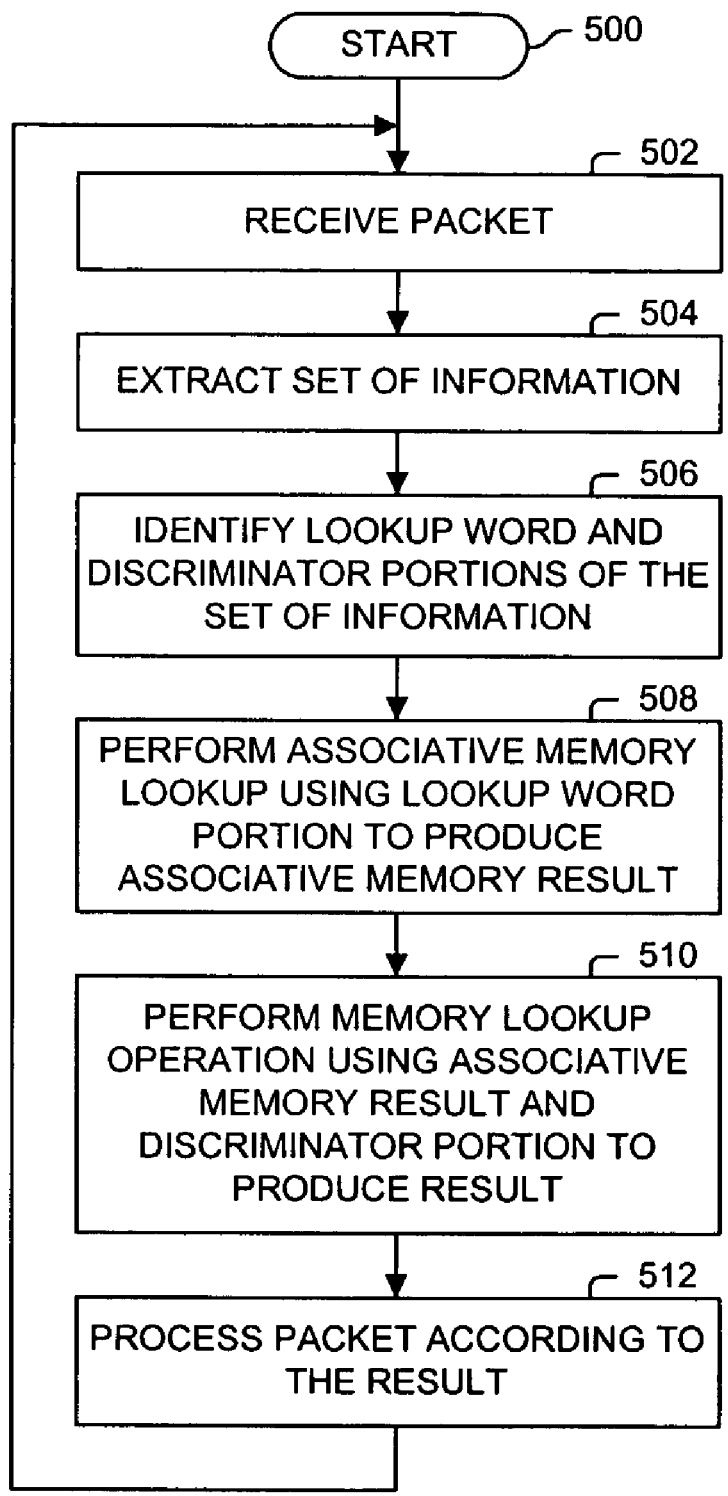
FIG. 5 is a flow diagram of a process for used in one embodiment for producing a result based on lookup word and discriminator portions of a set of information.

FIG. 5 illustrates a process used in one embodiment to receive and process packets (or other types of sets of information.) Processing begins with process block 500, and proceeds to process block 502, wherein a packet is received. Next, a set of information is extracted from the received packet. In process block 506, the lookup word and discriminator portions are extracted, and in process block 508, an associative memory lookup is performed based on the lookup word portion to produce an associative memory result. Next, in process block 510, a memory lookup operation is performed based on the associative memory result and the discriminator portion to produce a result, which is used in process block 512 to process the packet. Processing returns to process block 502 to receive and process more packets.

Figure 6A:
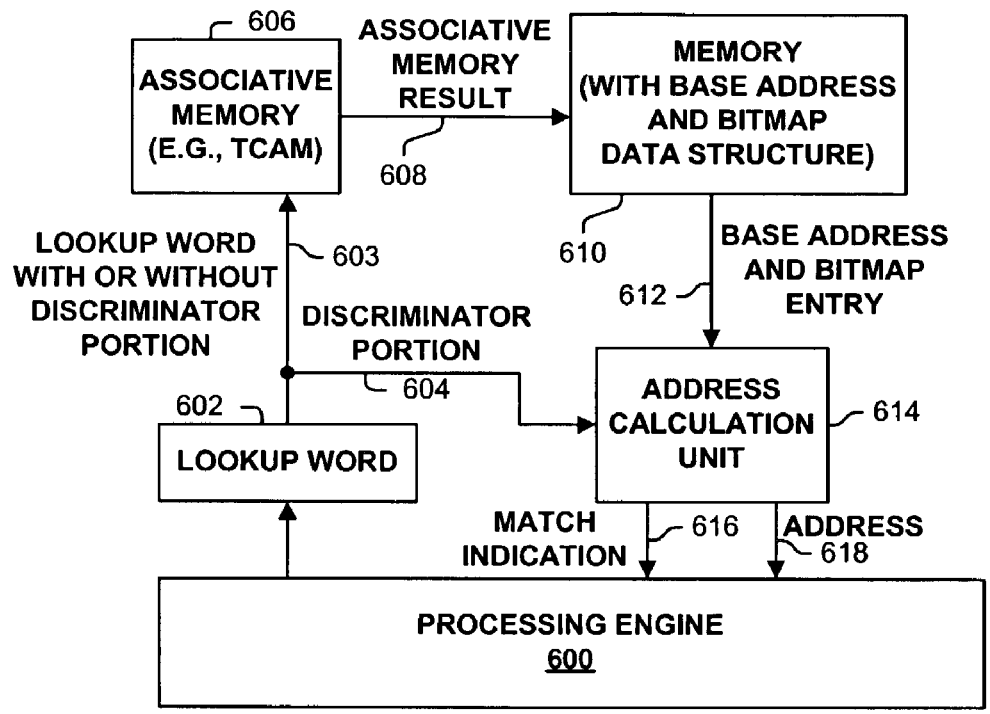
FIGS. 6A-C are block and flow diagrams illustrating mechanisms for calculating an address for use in subsequent processing.

FIG. 6A illustrates a block diagram of one mechanism used in one embodiment to generate a result 618 and/match indication 616. As depicted, processing engine 600 generates a lookup word 602, including a discriminator portion 604 and a lookup word 603 which may or may not include discriminator portion 604. A lookup operation is performed in associative memory 606 to generate lookup result 608, which is used as input to memory 610 to produce base address and bitmap entry 612. In one embodiment, base address and bitmap entry 612 is only produced when associative memory result 608 corresponds to the result of a successful lookup operation in associative memory 606. Address calculation unit 614 generates match indication 616 and address 618 based on discriminator portion 604 and base address and bitmap entry 612. Match indication 616 and address 618 can then be used or forwarded by processing engine 600.

Figure 6B:
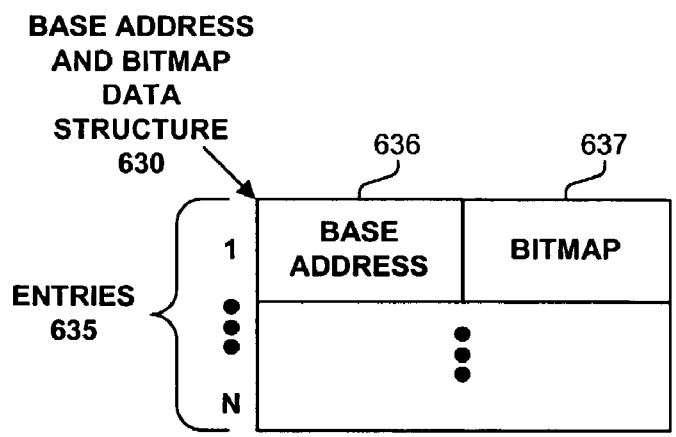

FIG. 6B illustrates a base address and bitmap data structure 630 used in one embodiment. As depicted, base address and bitmap data structure 630 includes one or more entries 635, each typically containing a base address field 636 and a bitmap field 637. In one embodiment, base address and bitmap entry 612 (FIG. 6A) corresponds to an entry 635 indexed by discriminator portion 604 (or a subset thereof).

Figure 6C:
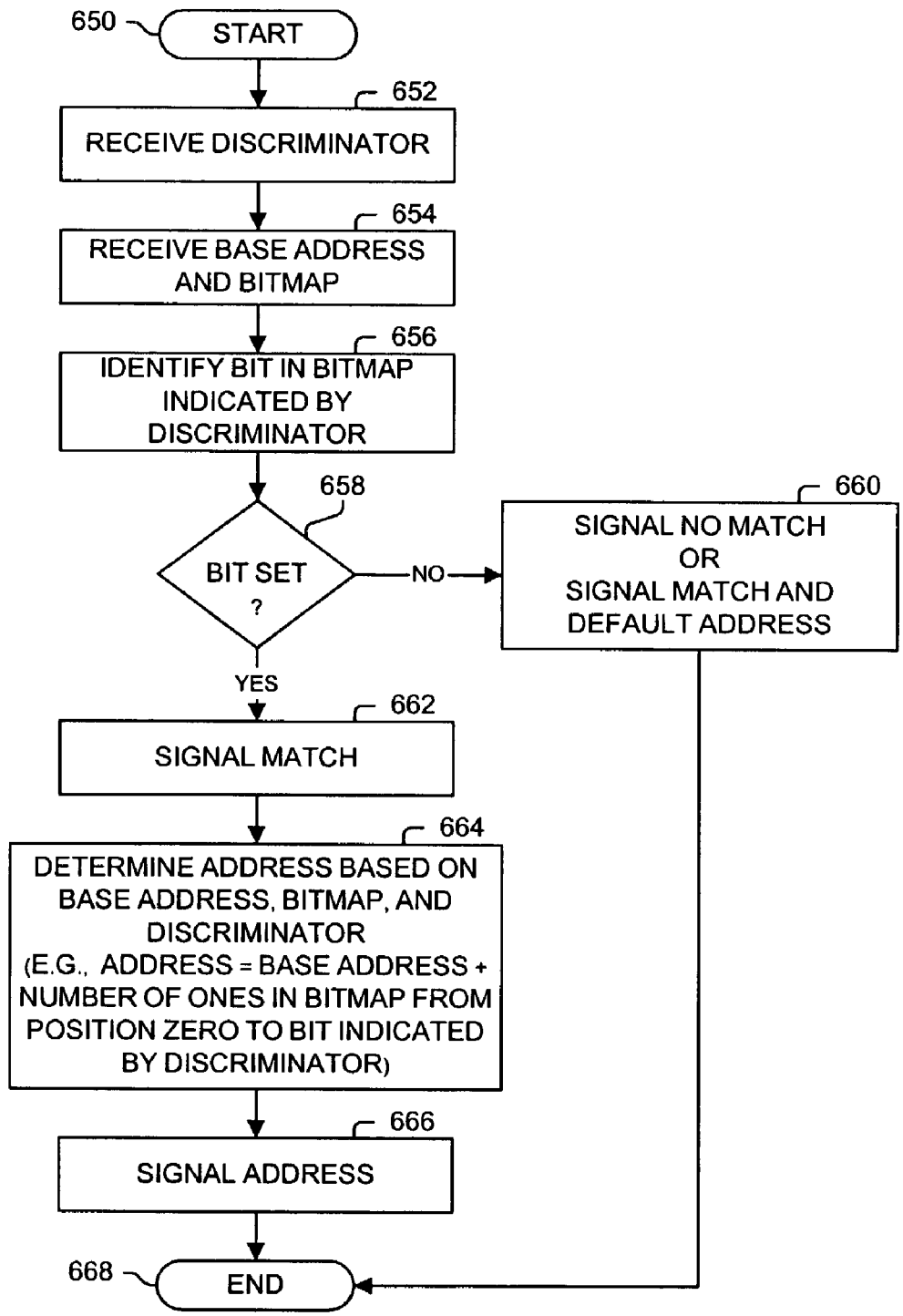

FIG. 6C illustrates processing performed in one embodiment for generating an address for use in subsequent processing, such as, but not limited to that based on discriminator portion 604 and base address and bitmap entry 612 (FIG. 6A) or one of the entries 635 (FIG. 6B). Processing begins with process block 650, and proceeds to process block 652, wherein a discriminator is received. In process block 654, the base address and bitmap values are received. Next, in process block 656, a bit in the bitmap is identified based on the value of the discriminator. As determined in process block 658, if the identified bit is not set, then in process block 660, typically either (a) no match is signaled or (b) a match is signaled and some default value or other calculated value is signaled. Otherwise, in process block 662, a match is signaled, and in process block 664, the address is calculated typically based on the received discriminator, base address and bitmap values. In one embodiment, the address is determined by adding to the base address an offset value equal to the number of ones in the bitmap from position zero in the bitmap to that of the identified bit (e.g., that determined based on the discriminator.) Next in process block 666, the address is signaled. Processing is complete as indicated by process block 668.

FIGS. 7A-C, 8A-C, and 9 are block and flow diagrams illustrating additional mechanisms for generating a result for use in subsequent processing. In certain applications, it is often necessary to perform a classification operation (and thus a corresponding lookup operation) on a lookup word including multiple fields. For example, the lookup word might include a MPLS tag and IP address. For a particular packet and corresponding lookup operation, the value of one of the fields might be empty or irrelevant to a particular lookup operation. One embodiment performs a lookup operation on these multiple fields, and if a hit is indicated, the corresponding result is used; otherwise, a secondary lookup operation is performed typically just using the relevant information to generate the result. One embodiment performs a lookup operation on these multiple fields. If a hit is indicated, a secondary lookup operation is performed based on the result; otherwise, a secondary lookup operation is performed based on a corresponding discriminator portion of an original value. One embodiment allows for the programming of wildcard or default entries, and if a hit is indicated which corresponds to the location of a wildcard or default entry, then a secondary lookup operation is performed just using the relevant information to generate the result; otherwise, the original lookup result it used directly or on which a secondary lookup operation is performed to generate the result.

Figure 7A:
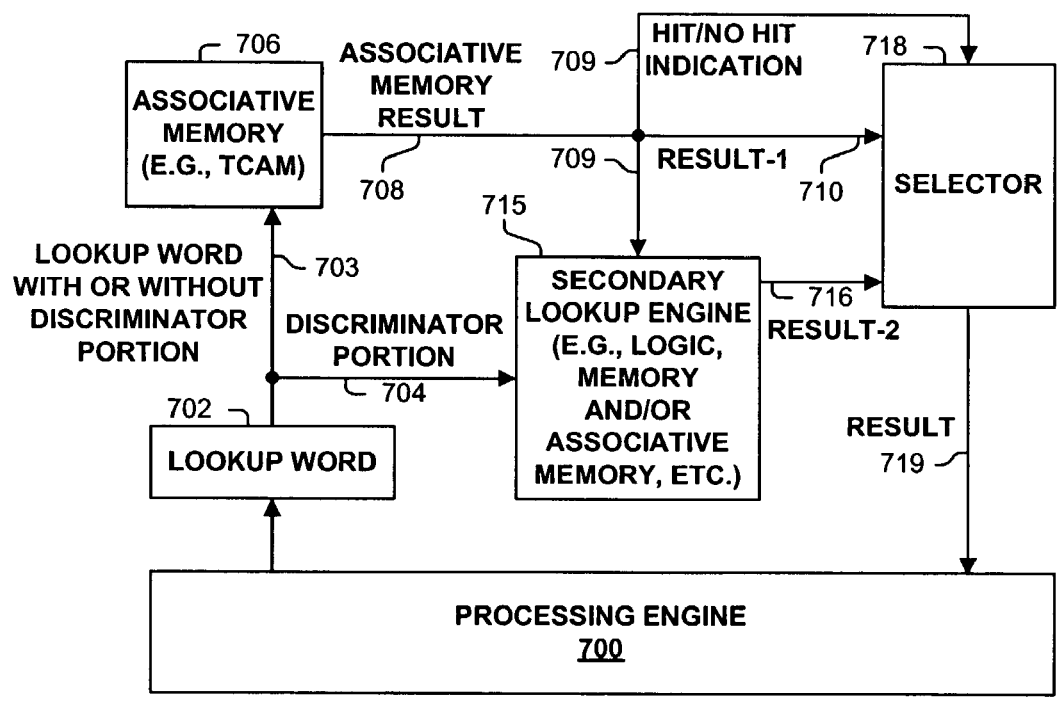
FIGS. 7A-C are block and flow diagrams illustrating mechanisms for generating a result for use in subsequent processing.

Turning to FIG. 7A, as depicted, processing engine 700 generates a lookup word 702, including a discriminator portion 704 and a lookup word 703 which may or may not include discriminator portion 704. A lookup operation is performed in associative memory 706 to generate associative memory result 708, which typically includes a hit/no hit indication 709 and a result value 710. Hit/no hit indication 709 is used by selector 718 to select between result 710 and 716 in producing result 719 which is signaled to processing engine 700. In one embodiment, if a hit is indicated by hit/no hit indication 709, then result 710 generated by associative memory 706 is used. In one embodiment, if a no hit is indicated by hit/no hit indication 709, then a secondary lookup operation (e.g. using a simple table, tree bitmap, mtrie, memory lookup, associative memory lookup, or using any other mechanism or method) is performed by secondary lookup engine 715 based on discrimination portion 704 to generate result 716, which is signaled to, and available to be selected by selector 718 based on hit/no hit indication 709.

Figure 7B:
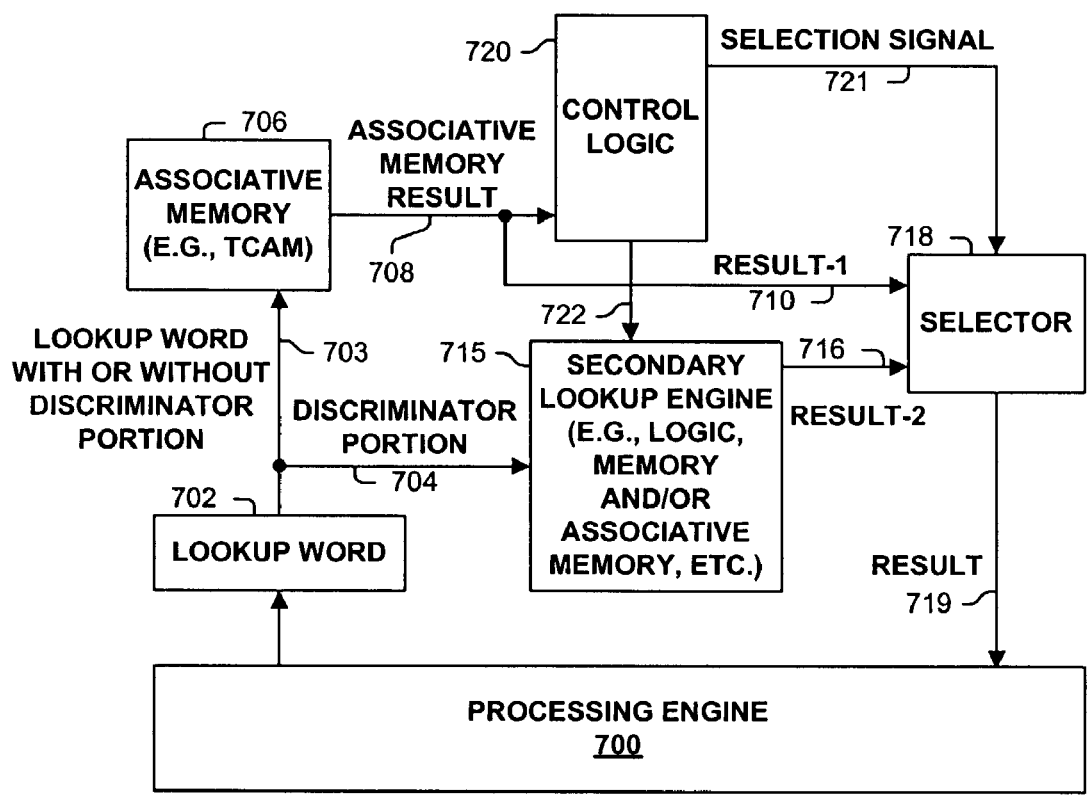

FIG. 7B illustrates a variant of the system shown in FIG. 7A. As depicted in FIG. 7B, processing engine 700 generates a lookup word 702, including a discriminator portion 704 and a lookup word 703 which may or may not include discriminator portion 704. A lookup operation is performed in associative memory 706 to generate associative memory result 708, which typically includes a hit/no hit indication and a result value 710. Control logic, based on associative memory result 708, generates a selection signal 721 used by selector 718 to select between result 710 and 716 in producing result 719 which is signaled to processing engine 700. In one embodiment, control logic 720 compares the value of result 710 to a predetermined value (e.g., an address of a default entry) and if not equal (and there was a hit), then control logic 720 generates selection signal 721 to select result 710; otherwise selection signal 721 signals to select result 716, and control logic 720 generates control signal 722 which indicates to secondary lookup engine 715 to perform the secondary lookup operation based on discriminator portion 704 to generate result 716.

Figure 7C:
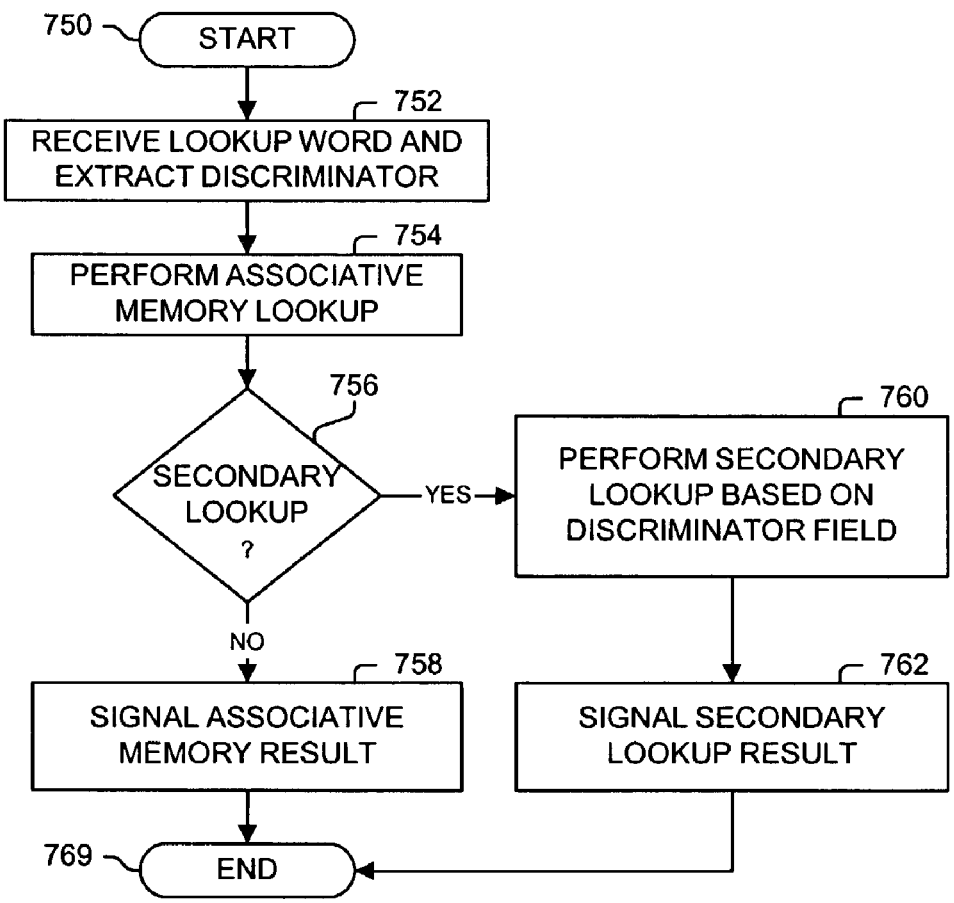

FIG. 7C illustrates processing performed in one embodiment for generating a result for use in subsequent processing. Processing begins with process block 750, and proceeds to process block 752 wherein the lookup word is received and the discriminator portion is extracted. In process block 754, an associative memory lookup operation is performed based on the lookup word (including or not including the discrimination portion). As determined in process block 756, if a secondary lookup operation should be performed (e.g., there was no hit, the associative memory lookup result matches or does not match a predetermined value or range of values, or based on any other indication or mechanism), then in process block 760, the secondary lookup operation is performed using a simple table, tree bitmap, mtrie, memory lookup, associative memory lookup, or using any other mechanism or method, and in process block 762, the secondary lookup result is signaled as the result. Otherwise, in process block 758, the associative memory result is signaled as the result. Processing is complete as indicated by process block 769.

Figure 8A:
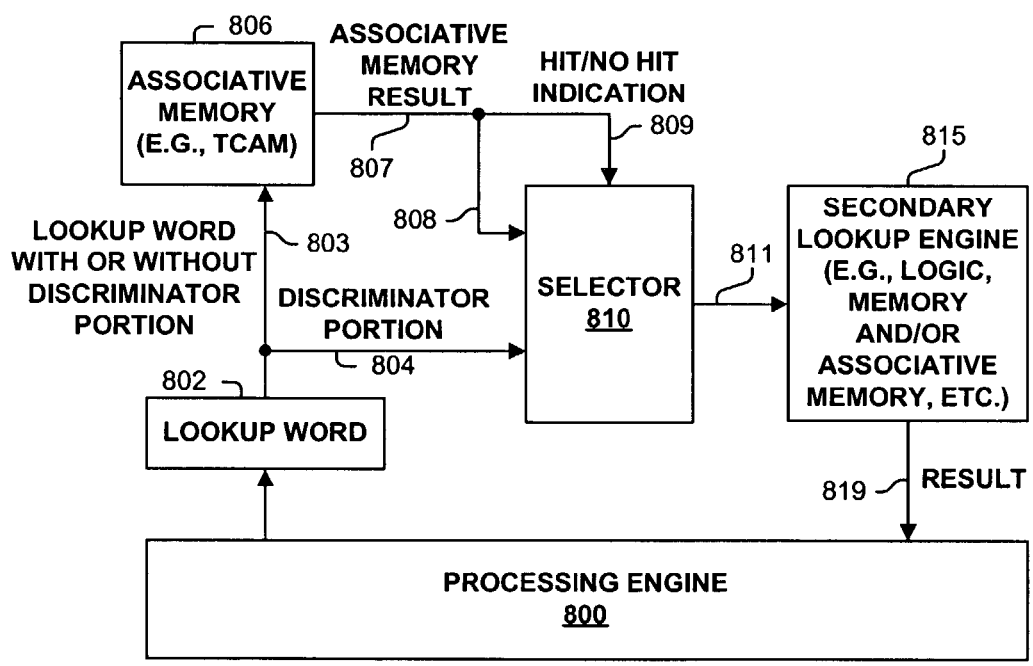
FIGS. 8A-C are block and flow diagrams illustrating mechanisms for generating a result for use in subsequent processing.

Turning to FIG. 8A, as depicted, processing engine 800 generates a lookup word 802, including a discriminator portion 804 and a lookup word 803 which may or may not include discriminator portion 804. A lookup operation is performed in associative memory 806 to generate associative memory result 807, which typically includes a hit/no hit indication 809. Associative memory result 808 typically includes the address identified by the associative memory lookup operation when there is a successful hit, and typically does not, but may include hit/no hit indication 809. Hit/no hit indication 809 is used by selector 810 to select between associative memory result 808 and discriminator portion 804 to produce selected value 811, which then is provided to secondary lookup engine 815. Secondary lookup engine 815 performs a secondary lookup operation (e.g. using a simple table, tree bitmap, mtrie, memory lookup, associative memory lookup, or using any other mechanism or method) to generate result 819, which is signaled to processing engine 800. In one embodiment, if a hit is indicated by hit/no hit indication 809, then associative memory result 808 is used. In one embodiment, if a no hit is indicated by hit/no hit indication 809, then discriminator portion 804 is used.

Figure 8B:
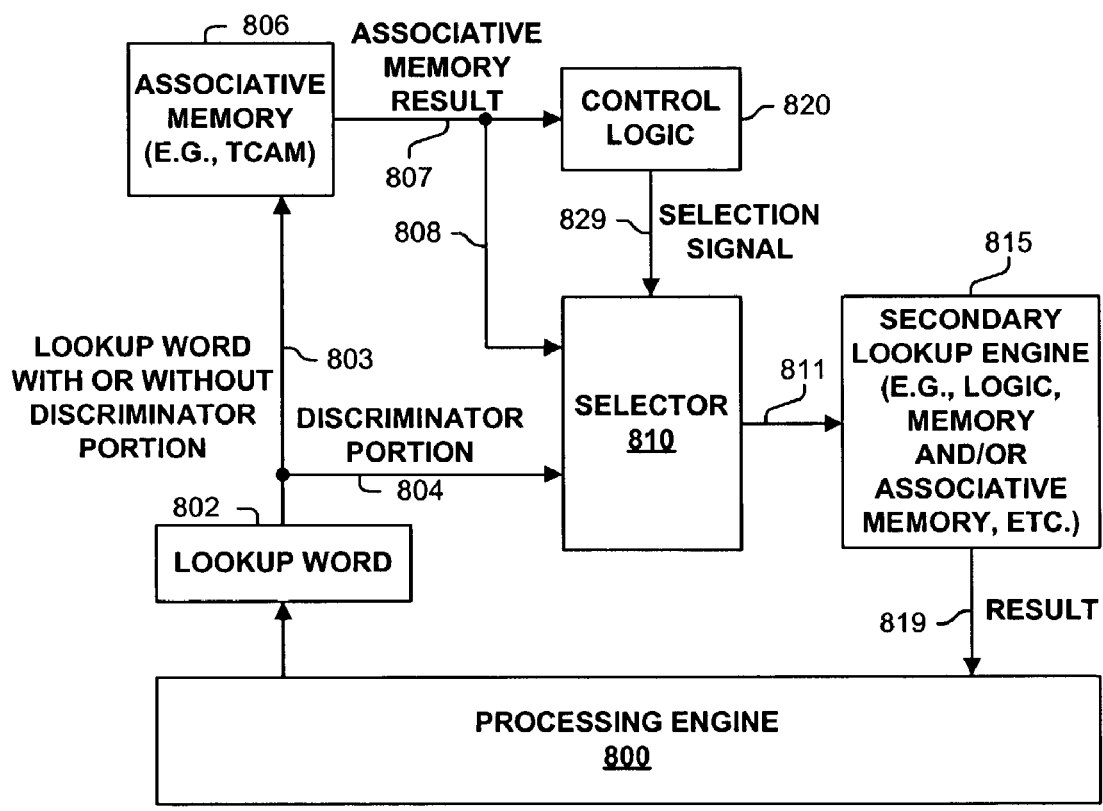

FIG. 8B illustrates a variant of the system shown in FIG. 8A. As depicted in FIG. 8B, processing engine 800 generates a lookup word 802, including a discriminator portion 804 and a lookup word 803 which may or may not include a discriminator portion. A lookup operation is performed in associative memory 806 to generate associative memory result 807, which typically includes a hit/no hit indication. Associative memory result 808 typically includes the address identified by the associative memory lookup operation when there is a successful hit, and typically does not, but may include a hit/no hit indication. In one embodiment, control logic 820, based on associative memory result 807 (e.g., by identifying whether there was a hit or by comparing associative memory result 807 (or a portion thereof) to a predetermined value such as a single or range of addresses or other value(s) or based on any other indication or mechanism), generates selection signal 829 to control selector 810 selection between associative memory result 808 and discriminator portion 804 to produce selected value 811, which then is provided to secondary lookup engine 815.

Secondary lookup engine 815 performs a secondary lookup operation (e.g. using a simple table, tree bitmap, mtrie, memory lookup, associative memory lookup, or using any other mechanism or method) to generate result 819, which is signaled to processing engine 800. In one embodiment, if a hit is indicated by hit/no hit indication 809, then associative memory result 808 is used. In one embodiment, if a no hit is indicated by hit/no hit indication 809, then discriminator portion 804 is used.

Figure 8C:
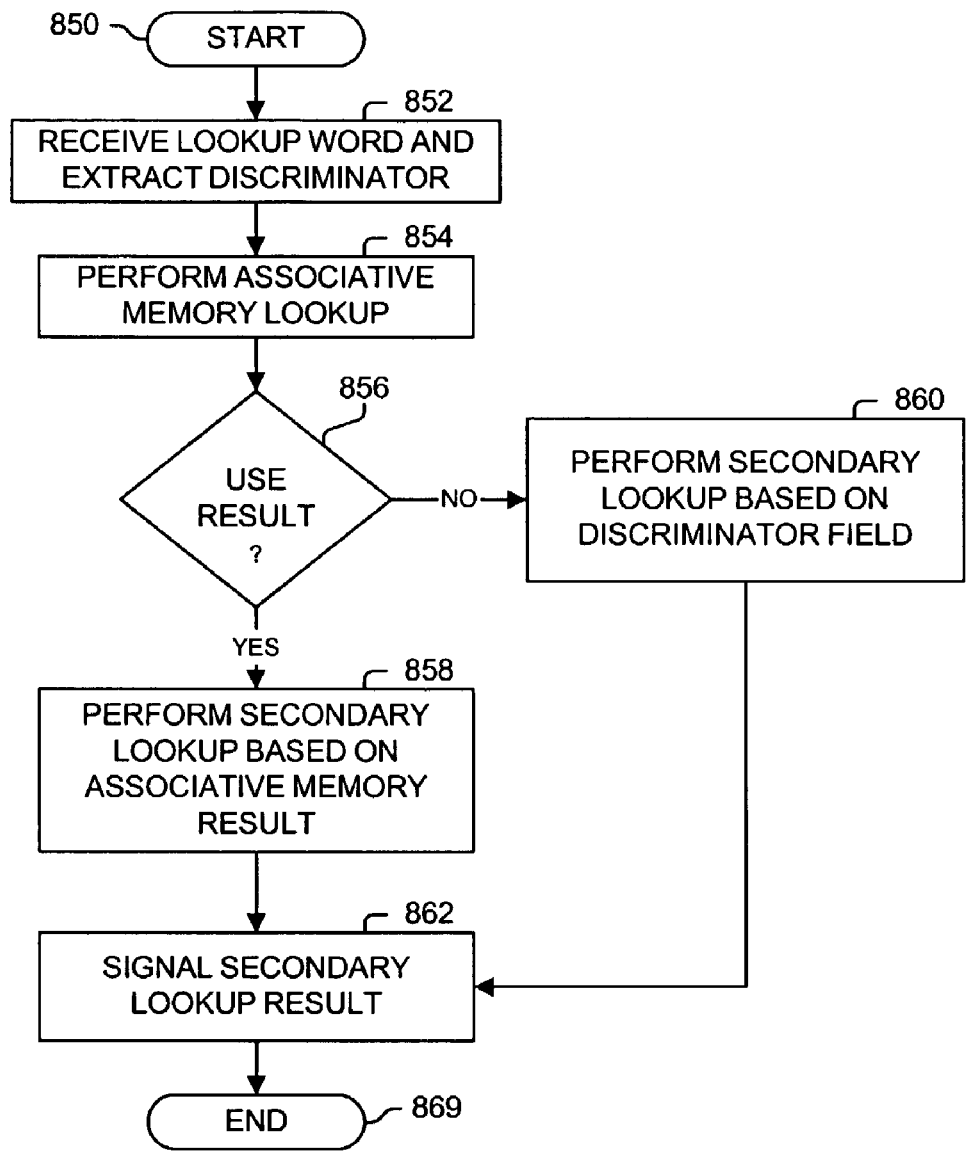

FIG. 8C illustrates processing performed in one embodiment for generating a result for use in subsequent processing. Processing begins with process block 850, and proceeds to process block 852 wherein the lookup word is received and the discriminator portion is extracted. In process block 854, an associative memory lookup operation is performed based on the lookup word (including or not including the discrimination portion). As determined in process block 856, if the associative memory result generated by the lookup operation in process block 854 is to be used (such as when in the case of a hit or by comparing the lookup result to a predetermined value such as a single or range of addresses or other value(s) or based on any other indication or mechanism), then in process block 858, a secondary lookup operation is performed based on the associative memory result. Otherwise, in process block 860, the secondary lookup operation is performed based on the discriminator field. In process block 862, the result of the secondary lookup operation is signaled, typically to another component or device for use in subsequent processing. Processing is complete as indicated by process block 869.

Figure 9:
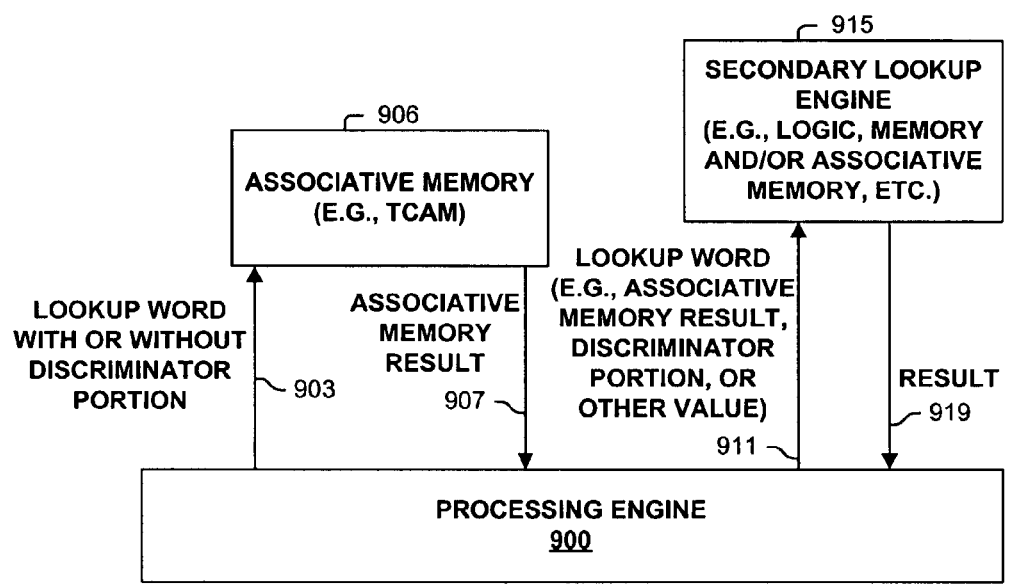
FIG. 9 is a block illustrating a mechanism for generating a result for use in subsequent processing.

FIG. 9 illustrates yet another embodiment. As depicted, processing engine 900 generates a lookup word 903, which may or may not include a discriminator portion. A lookup operation is performed in associative memory 906 to generate associative memory result 907, which typically includes a hit/no hit indication and an indication of an address or other value when there is a hit, which is returned to processing engine 900. Based on the value of associative memory result 907, processing engine 900 generates a second lookup word 911, which can be associative memory result 907 or a portion thereof, a discriminator (e.g., a subset of an original value containing the discriminator and lookup word 903), or any other value. A secondary lookup operation is performed by secondary lookup engine 915 based on lookup word 911 to generate result 919, which is communicated to processing engine 900.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:

performing a lookup operation in an associative memory using a key including a lookup word portion and a discriminator to generate a lookup result including an address, said performance of the lookup operation including comparing the key against entries stored in the associative memory;

retrieving a base address and a bitmap from a location, identified by the address, within a random access memory, with the bitmap including a plurality of bits;

generating a particular address result based on the discriminator, the bitmap, and the base address, including: identifying a bit position in the bitmap indicated by the discriminator; in response to determining that the bit position indicated by the discriminator is set, generating a match indication; and calculating the particular address result by adding to the base address the number of set bits from position zero to said identified bit position; and processing one or more packets by a processing engine based on the particular address result and the match indication.

2. An apparatus, comprising:

means for performing a lookup operation in an associative memory using a key including a lookup word portion and a discriminator to generate a lookup result including an address, said performance of the lookup operation including comparing the key against entries stored in the associative memory;

means for retrieving a base address and a bitmap from a location, identified by the address, within a random access memory, with the bitmap including a plurality of bits;

means for generating a particular address result based on the discriminator, the bitmap, and the base address, including: identifying a bit position in the bitmap indicated by the discriminator; in response to determining that the bit position indicated by the discriminator is set, generating a match indication; and calculating the particular address result by adding to the base address the number of set bits from position zero to said identified bit position; and means for processing one or more packets by a processing engine based on the particular address result and the match indication.

3. A method, comprising:

performing a first lookup operation in an associative memory based on a key comprising a lookup word to generate a lookup result, the lookup result including a lookup result value, said performance of the first lookup operation including comparing the key against entries stored in the associative memory; wherein the lookup word includes a discriminator and a lookup word portion;

identifying to use as a particular index in a second lookup operation: the discriminator without including the lookup word portion; and in response to the result of said identifying operation determining to use the discriminator without including the lookup word portion, performing the second lookup operation in a random access memory to retrieve the result stored at a location in the random access memory at an address within the random access memory identified based on the particular index consisting of the discriminator without including the lookup word portion; and processing one or more packets by a processing engine based on the result, without a lookup word portion result, being communicated to the processing engine.

4. The method of claim 3, wherein the lookup result includes a hit/no hit indication; and wherein said identifying operation includes examining the hit/no hit indication.

5. The method of claim 3, wherein said identifying operation includes comparing the lookup result value to a predetermined value.

6. An apparatus, comprising:
an associative memory configured to be responsive to a selection between a lookup word or a lookup word portion of the lookup word and to perform a lookup operation based on a key including said selection of the lookup word to generate a lookup result, the lookup result including a lookup result value and a hit/no hit indication, said performance of the lookup operation including comparing the key against entries stored in the associative memory; wherein the lookup word includes a discriminator and a lookup word portion;

means for identifying whether to use as a second key: (a) the discriminator without including the lookup word portion in the second key, or (b) the lookup result value; and a secondary lookup engine configured to perform a second lookup operation in a random access memory to retrieve the second result value stored at a location in the random access memory at an address within the random access memory identified based on the second key consisting of the discriminator without the lookup word; and a processing engine configured to process one or more packets based on the second result value, without a lookup word portion result, being communicated to the processing engine.

7. The apparatus of claim 6, said means for identifying includes means for examining the hit/no hit indication.

8. The apparatus of claim 6, said means for identifying includes means for comparing the lookup result value to a predetermined value.

* * * * *